US008706623B2

(12) United States Patent
da Silva et al.

(10) Patent No.: US 8,706,623 B2
(45) Date of Patent: Apr. 22, 2014

(54) UPGRADING OF RECURRING PAYMENT CANCELLATION SERVICES

(75) Inventors: Luis Filipe de Almeida Ferreira da Silva, Brussels (BE); Sharon A. Rosano, New Canaan, CT (US); Timothy T. Hopkins, Ballwin, MO (US)

(73) Assignee: MasterCard International, Inc., Purchase, NY (US)

( * ) Notice: Subject to any disclaimer, the term of this patent is extended or adjusted under 35 U.S.C. 154(b) by 0 days.

(21) Appl. No.: 13/431,291

(22) Filed: Mar. 27, 2012

(65) Prior Publication Data

US 2012/0265683 A1 Oct. 18, 2012

Related U.S. Application Data

(60) Provisional application No. 61/475,791, filed on Apr. 15, 2011.

(51) Int. Cl.
*G06Q 40/00* (2012.01)
*G06Q 20/00* (2012.01)
(52) U.S. Cl.
CPC .................................. *G06Q 20/00* (2013.01)
USPC ........................................................ 705/40

(58) Field of Classification Search
CPC ........................................................ G06Q 20/00
USPC ........................................................ 705/40, 44
See application file for complete search history.

(56) References Cited

U.S. PATENT DOCUMENTS

| 2008/0288405 | A1 | 11/2008 | John | |
| 2010/0299253 | A1* | 11/2010 | Patterson | 705/40 |
| 2010/0299254 | A1* | 11/2010 | Patterson | 705/40 |
| 2010/0332393 | A1 | 12/2010 | Weller et al. | |
| 2011/0295743 | A1* | 12/2011 | Patterson | 705/40 |

OTHER PUBLICATIONS

Mastercard International Inc. Brochure, "MasterCard Recurring Payment Cancellation Service," (2006).

* cited by examiner

*Primary Examiner* — Samica L Norman
(74) *Attorney, Agent, or Firm* — Hoffmann & Baron LLP

(57) ABSTRACT

A method of reducing chargebacks due to a cancelled recurring payment, wherein the payment occurs within a card-based financial network, and wherein the network includes a database of unauthorized recurring charges and a defined chargeback procedure. The method generally includes the step of upgrading a recurring payment cancellation services file based on predefined occurrences relating to the identifying of cancelled recurring payments.

4 Claims, 7 Drawing Sheets

UPGRADING OF RECURRING PAYMENT CANCELLATION SERVICES

CROSS-REFERENCE TO RELATED APPLICATION

This application claims the benefit of U.S. Provisional Application No. 61/475,791, filed Apr. 15, 2011, which is incorporated herein by reference in its entirety for all purposes.

BACKGROUND OF THE INVENTION

The present invention relates to recurring payment cancellation services and, more particularly, to a system and method for upgrading cancellation services relating to the identifying of cancelled recurring payments.

Recurring payments are common in the marketplace. A cardholder preauthorizes a merchant to automatically bill a credit or debit card at a preset interval (e.g., monthly, quarterly or annually). This is typically done for a matter of convenience for both the cardholder and the merchant. These payment transactions typically occur without incident.

However, changes in the merchant/cardholder relationship can introduce challenges into the process. For example, the cardholder may revoke preauthorization to bill his account due to either a change in payment type or discontinuation of a merchant relationship. Although most merchants quickly honor the change in the recurring payment billing arrangement, there are times when the merchant does not make the requested change in a timely fashion. In this case, the cardholder continues to incur the periodic charge. He then contacts the card issuer, and requests a refund. This request for a refund results in the issuing bank seeking a chargeback from the merchant bank.

Although a payment network such as the MasterCard Worldwide Network includes a procedure for chargebacks, this process nevertheless results in cost to the participants, as well as a potential loss of goodwill between the issuing back and the cardholder. Continued billing to a cardholder's account results in complaints to the issuer's customer service department, and may even result in the cardholder asking to have his or her account closed.

To reduce the frequency of chargebacks resulting from cancelled recurring payments, as well as to maintain the relationship between the issuing bank and its cardholder, a cancellation service can be provided whereby a database is maintained of unauthorized recurring payments associated with particular cards. An issuing bank can participate in such a cancellation service by inputting information associated with a particular card into the database to prevent future unauthorized billing from a selected merchant. In this way, the recurring charge is blocked before it can appear on the cardholder's bill, thus eliminating complaints from the cardholder, as well as the need for a chargeback by the issuing bank.

Although databases of cancelled recurring payments are effective in blocking unauthorized recurring payments, the existing systems require the issuing bank (or some other authorized entity) to provide the database with the necessary financial data, e.g., account number, merchant identity, merchant bank identity and transaction amount. Typically, this data is manually entered into the database by an employee of the issuing bank. As a result, the entry of data into the cancellation database can be delayed and/or never completed due to the time and effort involved with inputting such data.

In addition, some charges are not properly identified as recurring payments by the submitting merchant. This failure to identify the payment as a recurring payment can result in the bypassing of the cancellation database during the authorization/clearance process.

There is therefore a need in the art for a system and method for providing an updated database of cancelled recurring payments for comparison during the authorization and/or clearance process. There is a further need in the art for a system and method of identifying cancelled recurring payments even when the submitted charge is not properly identified as a recurring payment.

SUMMARY OF THE INVENTION

The present invention involves a method of reducing chargebacks due to a cancelled recurring payment, wherein the payment occurs within a card-based financial network, and wherein the network includes a database of unauthorized recurring charges and a defined chargeback procedure. The method generally includes the step of creating an entry within the database during the chargeback procedure when the chargeback procedure is related to a cancelled recurring payment, whereupon the cancelled recurring payment is subsequently identified in the database as an unauthorized recurring charge.

In a preferred embodiment, the method further includes the step of extracting predefined data associated with the cancelled recurring payment, wherein the creating step includes the further step of populating a field associated with the database with the predefined data. Also, the creating step preferably includes the further steps of comparing the predefined data associated with the cancelled recurring payment to file data contained within the database and inputting at least one item from the predefined data into the database in accordance with predefined parameters.

The present invention also involves a method of reducing chargebacks due to a cancelled recurring payment, wherein the payment occurs within a card-based financial network, and wherein the network includes a database of unauthorized recurring charges and a defined automatic billing updating procedure for assigning a new account number to a cardholder. The method generally includes the step of updating the database during the automatic billing updating procedure when the network identifies an unauthorized recurring charge in said database associated with said cardholder.

In a preferred embodiment, the method includes the further step of extracting predefined data associated with the automatic billing updating procedure, and the updating step includes the further step of populating a field associated with the database with the predefined data. When the unauthorized recurring charge is associated with an old account number, the updating step preferably includes the further step of associating the new account number with the old account number in the database, wherein a file is created containing both the old account number and the new account number for subsequent comparison.

The present invention further involves a method for reducing chargebacks due to a cancelled recurring payment, wherein the payment occurs within a card-based financial network, and wherein the network includes a cancellation service, which includes a database of unauthorized recurring charges. The method generally includes the steps of receiving a financial processing request identifying a card-based payment without a recurring payment code, determining whether the issuing bank associated with the request is a participant within the cancellation service, comparing data associated with the request to the unauthorized recurring charges contained within the database and determining a response to the processing request in accordance with predefined parameters.

In a preferred embodiment, the comparing step provides a plurality of authorization comparisons and includes the further step of assigning values to each of the authorization comparisons. The authorization comparisons are preferably related to selected secondary criteria, which includes information relating to at least one of a merchant identity, a merchant size, a length of time a merchant has been doing business, a number of cancelled recurring payments associated with a merchant, a number of chargebacks associated with a merchant or a billing date. The determining step preferably includes the further step of combining the values, and rejecting the processing request when the combination of values exceeds a predefined threshold, wherein the predefined threshold is determined by an issuing bank.

In another method for reducing chargebacks due to a cancelled recurring payment, the method generally includes the steps of receiving a financial processing request identifying a card-not-present (CNP) transaction, determining whether the issuing bank associated with the request is a participant within the cancellation service, comparing data associated with the request to the unauthorized recurring charges contained within the database and determining a response to the processing request in accordance with predefined parameters.

In a preferred embodiment of this method, the comparing step again provides a plurality of authorization comparisons, and includes the further step of assigning values to each of the authorization comparisons, wherein the authorization comparisons are related to selected secondary criteria. The determining step again preferably includes the further step of combining the values, and rejecting the processing request when the combination of values exceeds a predefined threshold, wherein the predefined threshold is determined by an issuing bank. This method is also carried out when the financial processing request is received without a recurring payment code.

A preferred form of the method according to the present invention, as well as other embodiments, objects, features and advantages of this invention, will be apparent from the following detailed description of illustrative embodiments thereof, which is to be read in conjunction with the accompanying drawings.

DETAILED DESCRIPTION OF THE INVENTION

Figure 1:
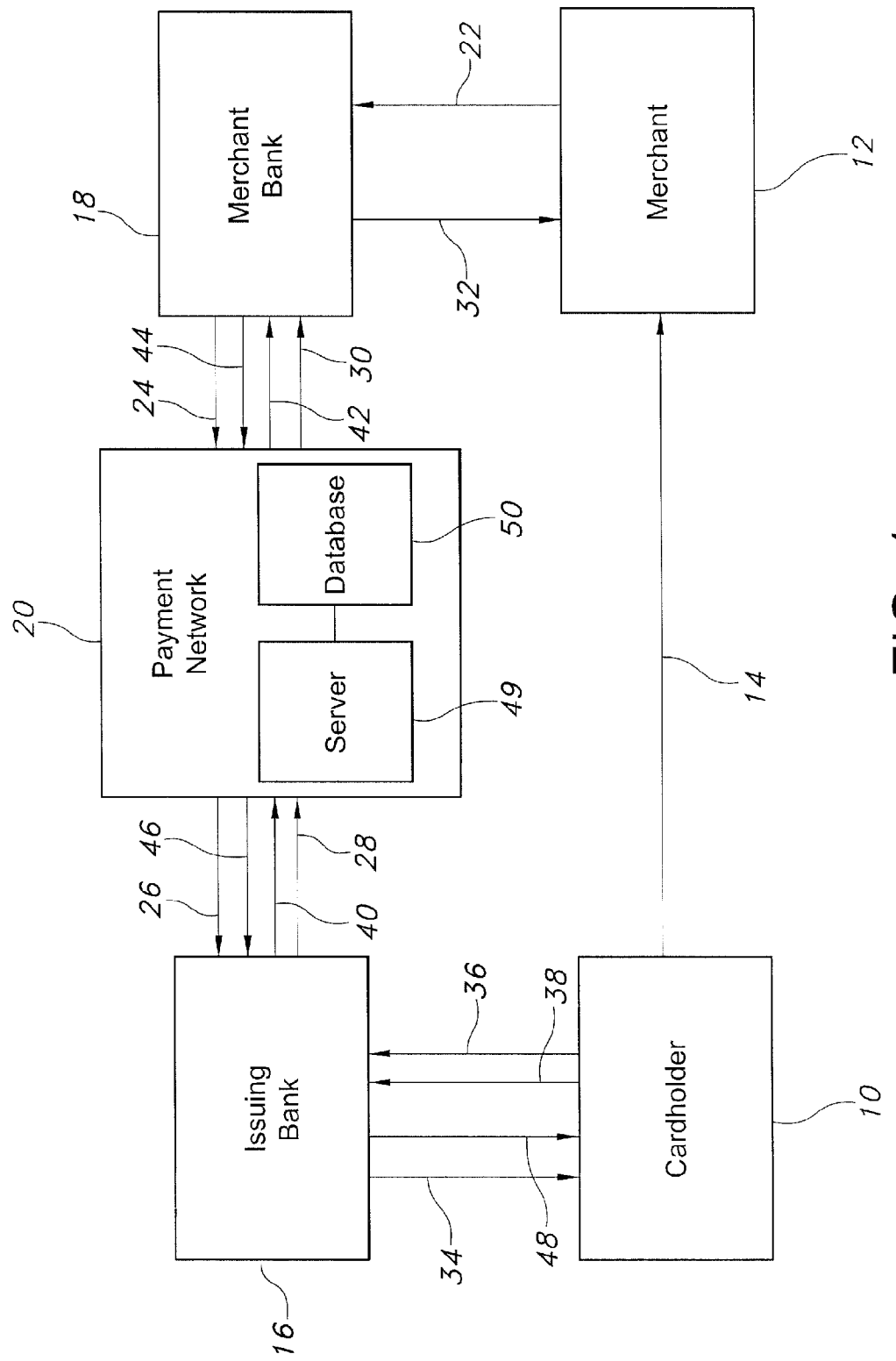
FIG. 1 is a schematical diagram of a card-based payment system.

Referring first to FIG. 1, in a typical card-based payment system transaction, a cardholder 10 presents his credit/debit card to a merchant 12 for the purchase of goods and/or services. This transaction is indicated by arrow 14. It will be understood that prior to the occurrence of transaction 14, cardholder 10 was issued a card by issuing bank 16. Moreover, it will be understood that merchant 12 established a relationship with a merchant bank 18, thereby allowing merchant 12 to receive credit/debit cards as payment for goods and/or services. The merchant banks and issuing banks may participate in various payment networks, including payment network 20. One such payment network is referred to as the MasterCard Worldwide Network.

After presentation of a card to merchant 12 by cardholder 10, merchant 12 sends an authorization request (indicated by arrow 22) to bank 18. In turn, bank 18 communicates with network 20 (indicated by arrow 24), and network 20 communicates with the issuing bank 16 (indicated by arrow 26) to determine whether the cardholder is authorized to make the transaction in question. An approval or disapproval of the authorization request is thereafter transmitted back to merchant 12 (indicated by arrows 28, 30 and 32). Merchant 12 thereafter either completes or cancels the transaction based upon the response to the authorization request.

If transaction 14 is approved, the transaction amount will be sent from issuing bank 16 through network 20 to bank 18. This transaction amount, minus certain fees charged by both network 20 and bank 18, will thereafter be deposited within a bank account belonging to merchant 12. Issuing bank 16 thereafter bills cardholder 10 (indicated by arrow 34) for the amount of such transaction, and cardholder 10 follows by a submission of payment(s) (as indicated by arrow 36) to issuing bank 16. This submission of payment(s) (as indicated by arrow 36) by cardholder 10 may be automated (e.g., in the case of debit transactions), may be initiated by the cardholder for the exact amount matching costs of purchases during the statement period (e.g., charge cards or credit balances paid in full), and/or may be submitted (in part or in whole) over a period of time that thereby reflects the costs of the purchases plus financing charges agreed upon beforehand between the cardholder and the cardholder's issuing bank (e.g., revolving credit balances.)

When cardholder 10 receives an unauthorized recurring charge, (whether a one-time, or a recurring charge), on his statement, the cardholder contacts issuing bank 16 (indicated by arrow 38) and requests a refund. Issuing bank 16 then initiates a chargeback (indicated by arrows 40, 42), requesting a refund of the payment from merchant bank 18. This refund is provided back to the cardholder (as indicated by arrows 44, 46, 48).

Network 20 preferably includes at least one server 49 and at least one database 50. Server 49 may include various computing devices such as a mainframe, personal computer (PC), laptop, workstation or the like. The server can include a processing device and be configured to implement an authorization and clearance process, which can be stored in computer storage associated with the server. The authorization and clearance process can be implemented by the server to prevent and/or reduce unauthorized recurring payments. Database 50 may include computer readable medium storage technologies such as a floppy drive, hard drive, tape drive, flash drive, optical drive, read-only memory (ROM), random access memory (RAM), and/or the like.

Figure 2:
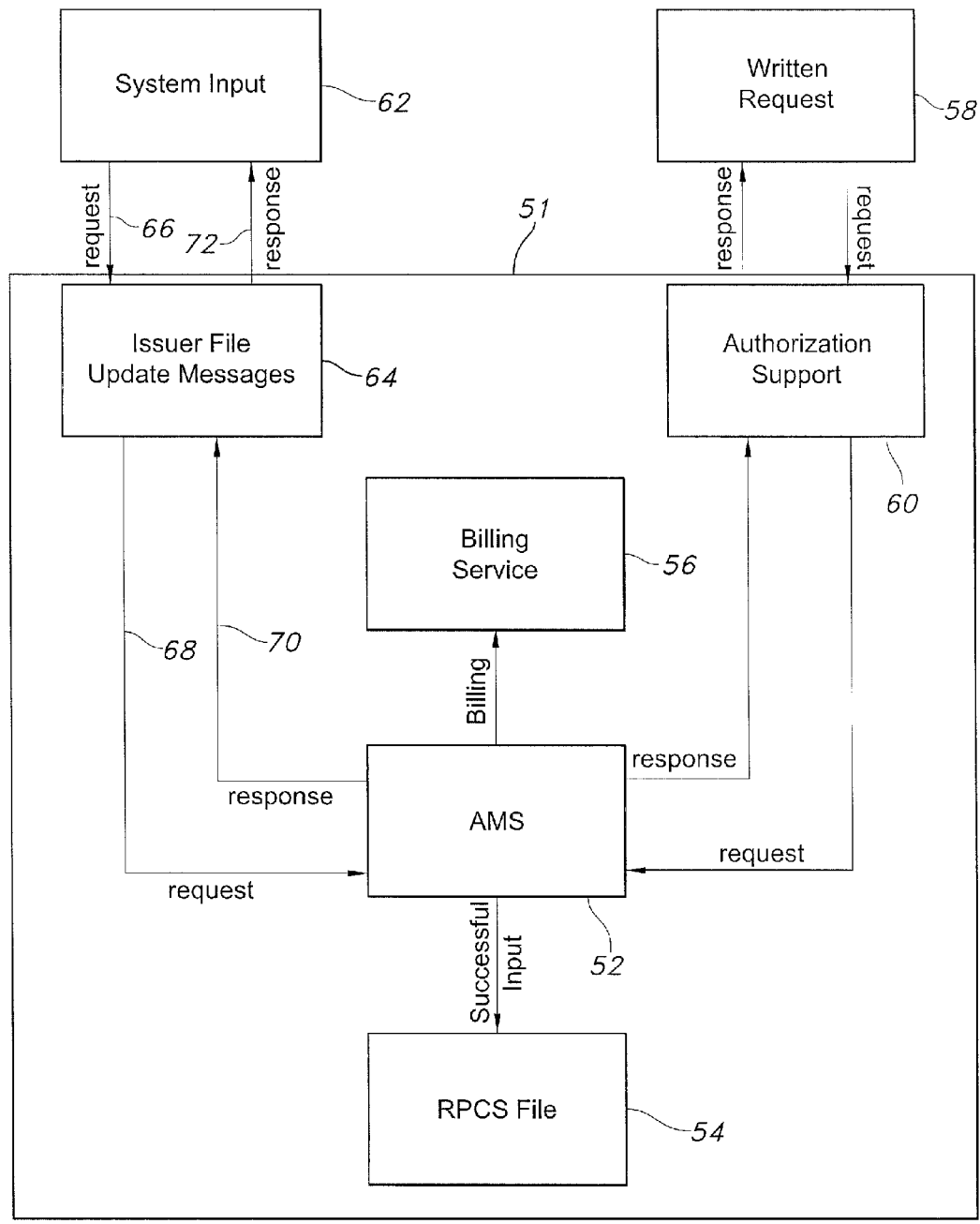
FIG. 2 is a flow diagram of a file maintenance process for a cancellation listing system.

Referring now to FIG. 2, a cancellation listing system 51 of the present invention is shown. System 51 is preferably implemented by network 20, and is preferably maintained by the network provider, e.g., MasterCard, or by an independent authorized third party. System 51 preferably includes an account management system (AMS) file 52, a recurring payment cancellation service (RPCS) file 54 and a billing service file 56. AMS file 52, RPCS file 54 and billing service 56 are preferably stored in database 50 of network 20, and processed by server 49. Although FIG. 2 depicts AMS file 52, RPCS file 54 and billing service file 56 as separate discrete files, these separate files could be contained within one larger file. In one preferred application, the mentioned files are stored within a single storage device as separate files. In another preferred application, RPCS file 54 is a sub-file of AMS file 52.

AMS file 52 is preferably a database of cards which have been flagged for non-authorization, e.g., lost or stolen cards, cards in collection and cards participating in the recurring payment cancellation service. In other words, the AMS file is essentially a negative database. AMS file 52 preferably communicates with both RPCS file 54 and billing service file 56. File 56 is associated with the billing of an issuing bank for each card entered into RPCS file 54.

Entering data into AMS file 52, and ultimately into RPCS file 54, may be accomplished in at least two ways. In the first way, a written request 58 is forwarded to the operator of system 51. The written request 58 includes the necessary data (e.g., account number, merchant identity, merchant bank identity, transaction amount) to be entered into RPCS file 54. The data is thereafter entered into RPCS file 54 by authorization support 60. The second method of inputting data into the RPCS file 54 involves the direct input of data by issuing bank 16 (or an authorized entity). More particularly, issuing bank 16 communicates with a system input 62, which then forwards the data through an issuer file 64. The input of the data into AMS 52 is depicted by arrows 66, 68, and the confirmation of the input of such data is depicted by arrows 70, 72. It is contemplated herein that system input 62 can be accomplished by various computing devices such as a mainframe, personal computer (PC), laptop, workstation, handheld device, or the like.

Figure 3:
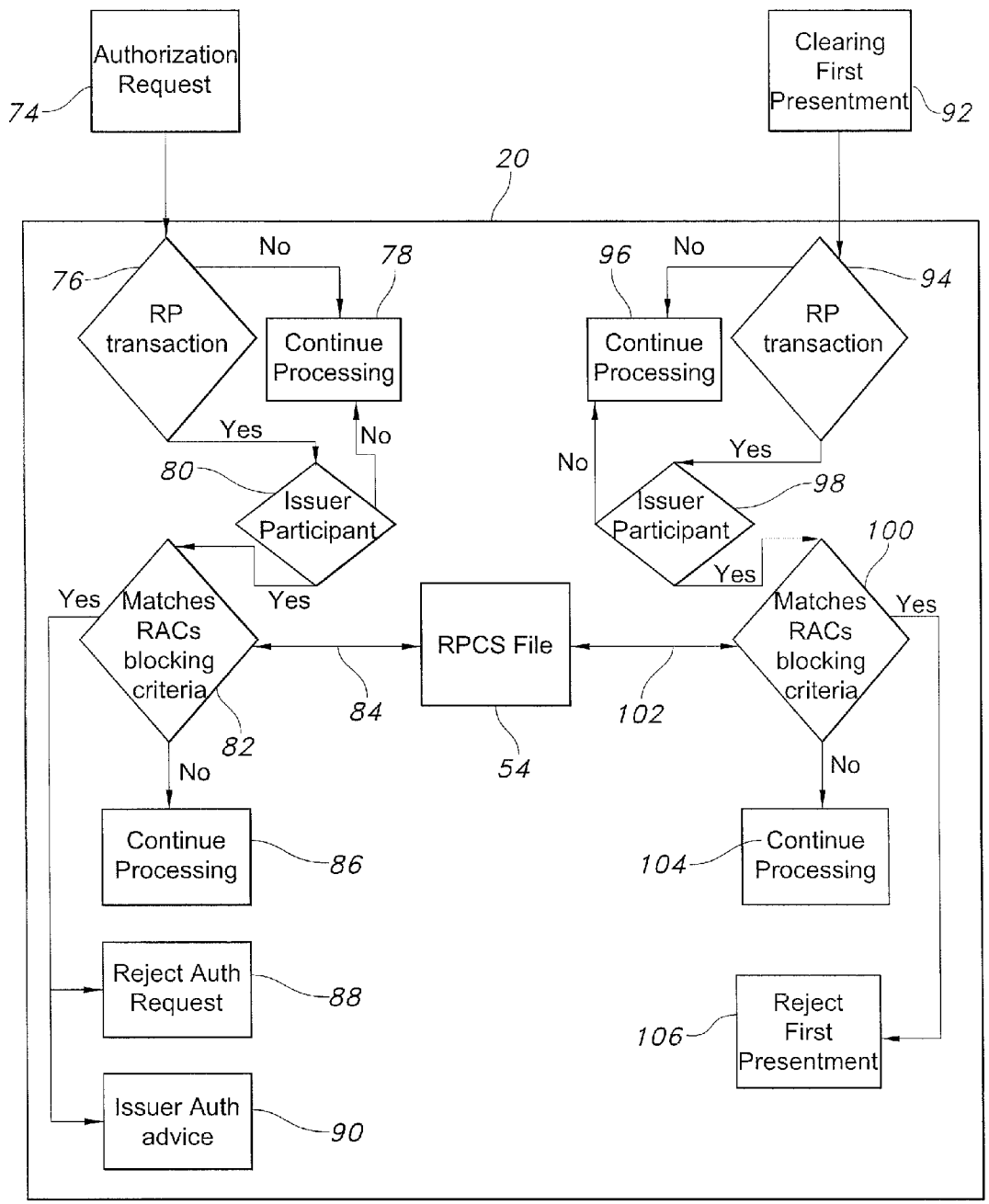
FIG. 3 is a flow diagram of an authorization and clearance process for a card-based transaction.

As will be recognized by those skilled in the art, the transaction processing of card-based payments include both an authorization side and a clearance side. The authorization side involves the process of confirming that the cardholder has a sufficient line of credit to cover the proposed payment. The clearance side of the transaction involves the process of moving funds from the issuing bank to the merchant bank. FIG. 3 depicts a transaction processing flow chart showing both the authorization side and the clearance side of the card-based payment.

Referring to FIG. 3, and to the authorization side of the transaction, an authorization request 74 is submitted by a merchant bank to network 20. Network 20 first considers whether the charge included in authorization request 74 is a recurring payment (76). In this regard, merchants and/or merchant banks preferably indicate a recurring payment as such by utilizing defined criteria, e.g., an identifying code. If the proposed charge is not a recurring payment transaction, then the processing of the authorization request continues at step 78 in ordinary fashion. However, if the proposed charge is indicated to be a recurring payment, then network 20 determines whether the issuing bank is an issuer participant (80). If the issuing bank is not an issuer participant, then the processing of the transaction continues at step 78 in ordinary fashion. If the issuing bank is an issuer participant, then network 20 determines whether the data associated with the proposed charge defined in the authorization request matches a recurring account charge (RAC) blocking criteria (82). This step is indicated at 84, and is accomplished by accessing RPCS file 54. If RAC blocking criteria are not found, then the processing of the authorization request continues in step 86 in ordinary fashion. If RAC blocking criteria are found, then the authorization request is rejected, as indicated by steps 88 and 90.

Turning now to the clearance side of the transaction, a clearing presentment 92 is submitted to network 20. Network 20 determines whether clearing presentment 92 involves a recurring payment (94), and if not, directs network 20 to continue processing the clearing presentment at step 96 in ordinary fashion. If clearing presentment 92 involves a recurring payment, then network 20 determines whether the issuing bank is an issuer participant (98). If the issuing bank is not an issuer participant, then network 20 continues processing the clearing presentment at step 96 in ordinary fashion. If the issuing bank is an issuer participant, then network 20 determines whether the data associated with the charge defined in the clearing presentment matches the RAC blocking criteria (100). This step is indicated at 102 in FIG. 3, and is accomplished by accessing RPCS file 54. If RAC blocking criteria are not found, then the processing of the clearing presentment continues at step 104 in ordinary fashion. If RAC blocking criteria are found, then the clearing presentment is rejected at step 106.

At present, the RPCS file maintenance described in FIG. 2 is isolated from the typical chargeback process described with respect to FIG. 1. In other words, unless the issuing bank ensures that the appropriate data is entered into RPCS file 54 (by either input 62 or written request 58), then the process described in FIG. 3 will be ineffective in identifying unauthorized recurring charges, and will be unable to reject such charges.

Accordingly, one aspect of the present invention is to associate the chargeback process with the RPCS file such that the process of performing a chargeback results in the creation of an entry within RPCS file 54 which will be available for future comparison during steps 82 and 100 of the transaction process. This entry in RPCS file 54 can be created because the chargeback process requires the input of the same or similar data required to flag an unauthorized recurring payment, e.g., the account number, merchant identity, merchant bank identity and transaction amount.

Figure 4:
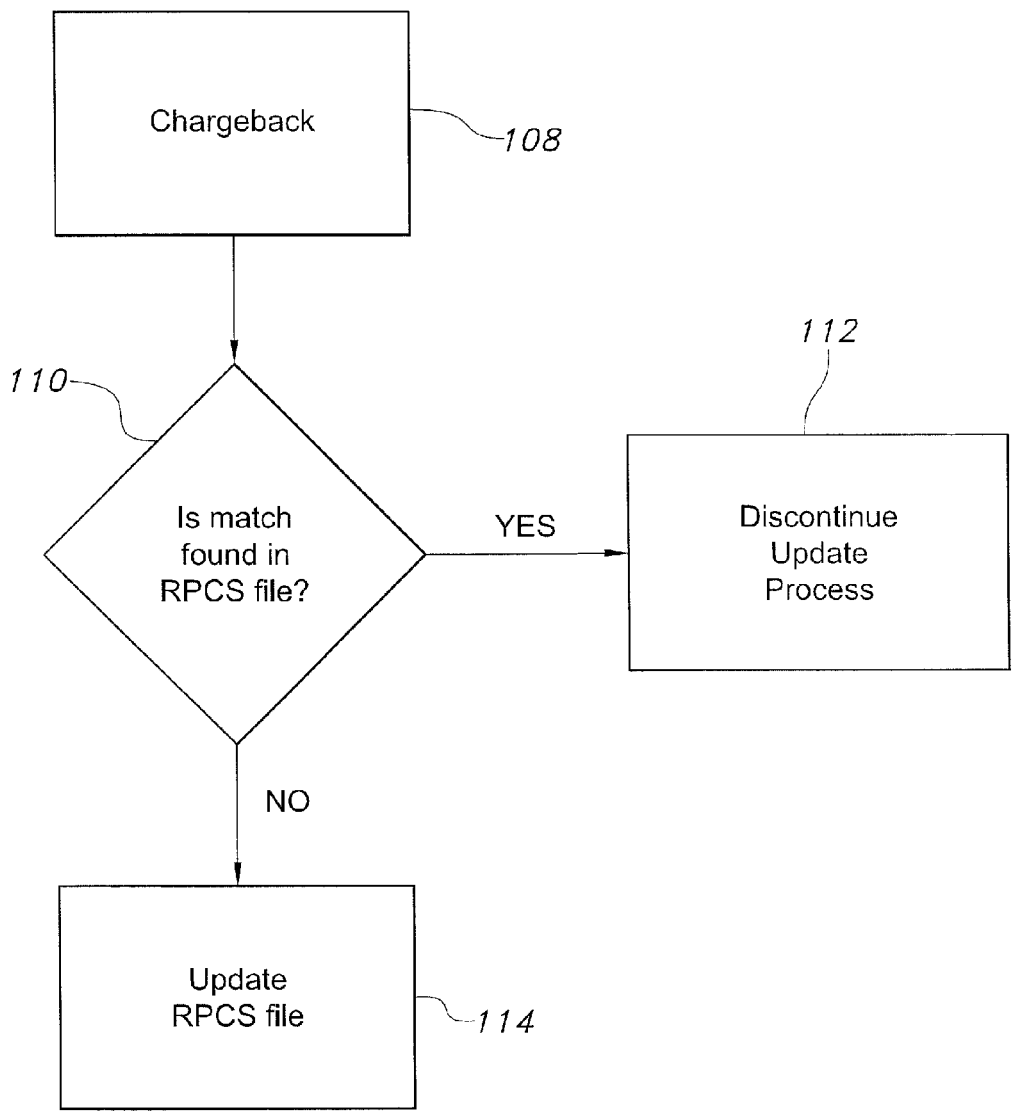
FIG. 4 is a flow diagram depicting the updating of a recurring payment cancellation service (RPCS) file during a chargeback process.

When issuing bank 16 initiates a chargeback within network 20, the chargeback is preferably associated with RPCS file 54 whereby the server(s) (e.g., server 49) and database(s) (e.g., database 50) involved in the chargeback process communicate with RPCS file 54, either directly or through AMS file 52, to add and/or update the data contained in RPCS file 54. The association between the chargeback process and RPCS file 54 is shown in greater detail in FIG. 4. More particularly, in addition to the normal steps incurred during a typical chargeback 108, the present invention adds the additional step (110) of contacting RPCS file 54 and determining whether a match is found in the stored data for the payment associated with the chargeback. Step 110 is preferably initiated when the chargeback 108 includes a predefined code indicating that such chargeback is due to a "cancelled recurring" charge. If a match is found in RPCS file 54 for the payment associated with the chargeback, then the updating process of RPCS file 54 is discontinued at step 112. If no match is found in RPCS file 54 for the payment associated with the chargeback, then RPCS file 54 is updated at step 114 to add the data associated with the chargeback to RPCS file 54, e.g., account number, merchant identity, merchant bank identity and transaction amount.

It is contemplated herein that network 20 may also include an automatic billing updater (ABU) platform 200. ABU platform may be stored in database 50, and processed by server 49. ABU platform 200 is used to automatically maintain the accuracy of account data for account-on-file payments, including recurring payments, between participating issuers, acquirers and merchants. Another aspect of the present invention is to associate ABU platform 200 with the RPCS file 54 such that the process of performing an ABU account number change results in the updating of RPCS file 54. More particularly, the RPCS file 54 can be updated to also include the new account number provided through the ABU account number change. In other words, RPCS file 54 will now include both the old and new account numbers, such that if a merchant attempts to process an unauthorized recurring payment using the new card number, the transaction will be flagged and subsequently rejected.

Figure 5:
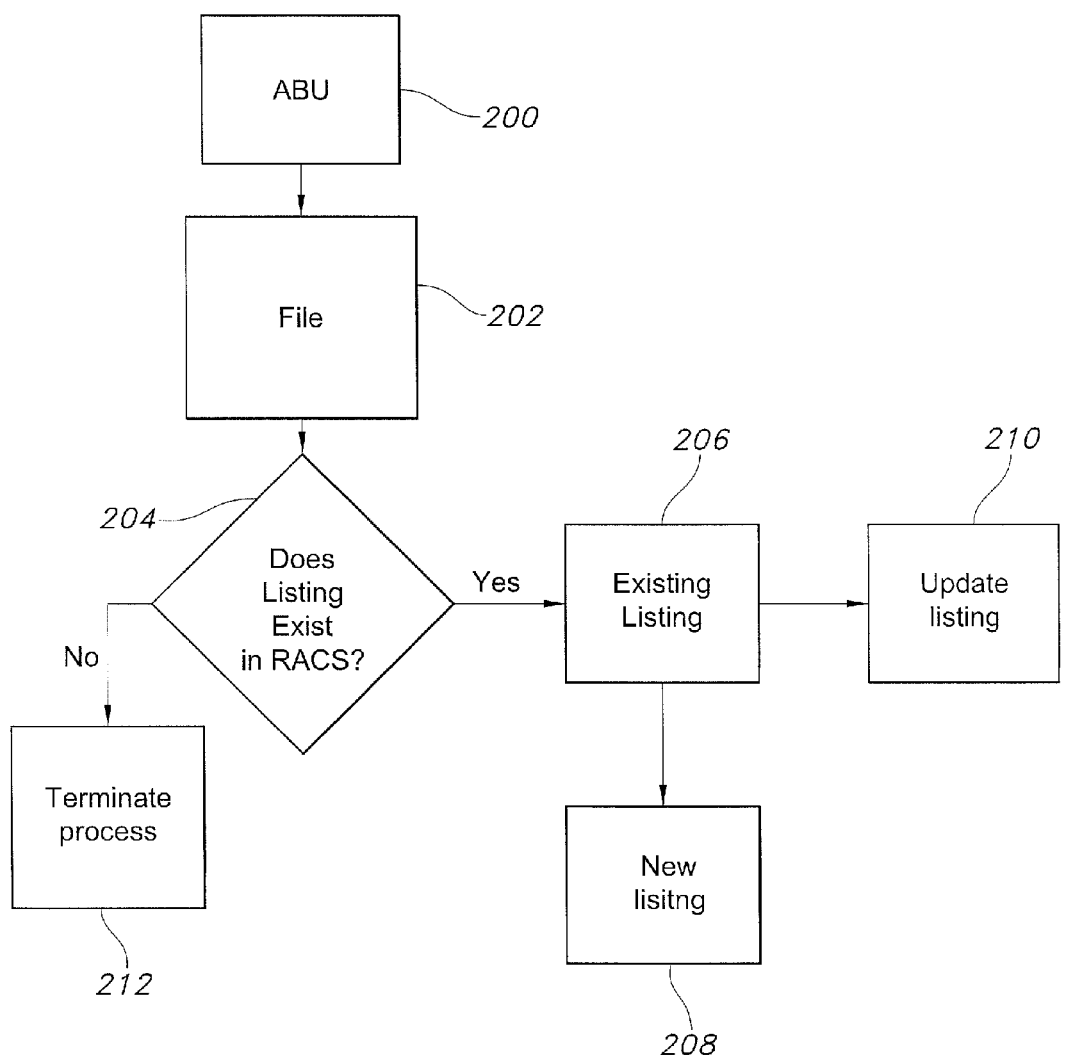
FIG. 5 is a flow diagram depicting the updating of a RPCS file during an automatic billing updating process.

Thus, as shown in FIG. 5, ABU platform 200 creates a file 202 containing both the old and new account numbers associated with a cardholder. The system then communicates with RPCS 54 to determine whether a listing exists for the old account number (204). If a listing 206 exists, then the system can either create a new RPCS listing with the duplicate information (208), or update the existing RPCS listing with the new account number (210). If no existing RPCS listing is found in step 204, then the process is terminated at step 212.

Although merchants and merchant banks are supposed to indicate recurring charges by coding such charges in a particular manner, this coding is not always associated with a recurring payment. The failure to properly code a payment can result from oversight, error or even intentional omission. Existing cancellation listing services require the payment to be identified as a "recurring payment" to trigger the RPCS file inquiry. Accordingly, a merchant may intentionally omit the recurring payment designation to avoid having the transaction denied. The present invention further contemplates at least two authorization and clearance processes (as shown in FIGS. 6 and 7) which consider the possibility that payments have been improperly labeled, i.e., that a recurring payment has not been labeled as such.

Figure 6:
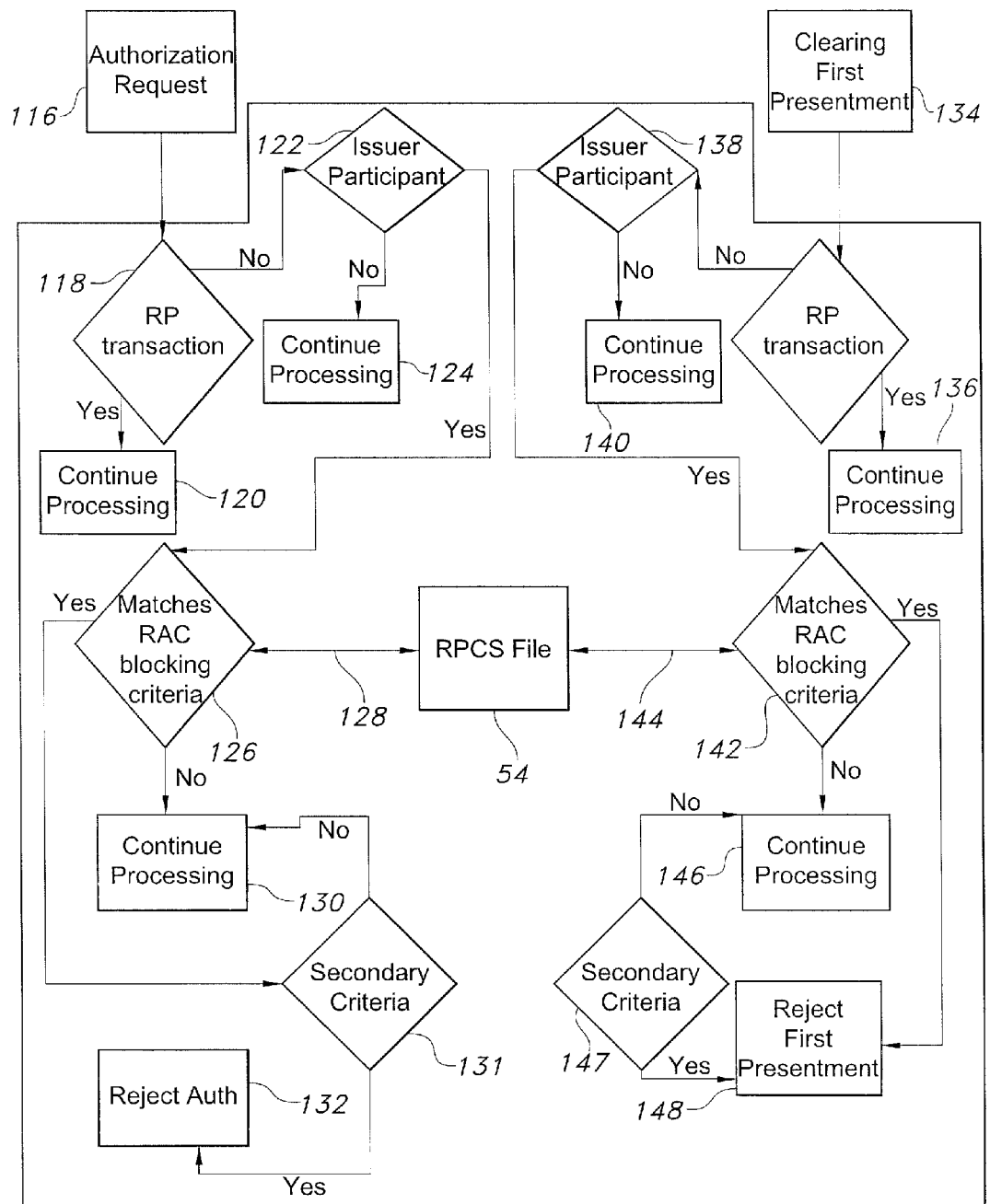
FIG. 6 is a flow diagram of an alternative authorization and clearance process for a card-based transaction.
Figure 7:
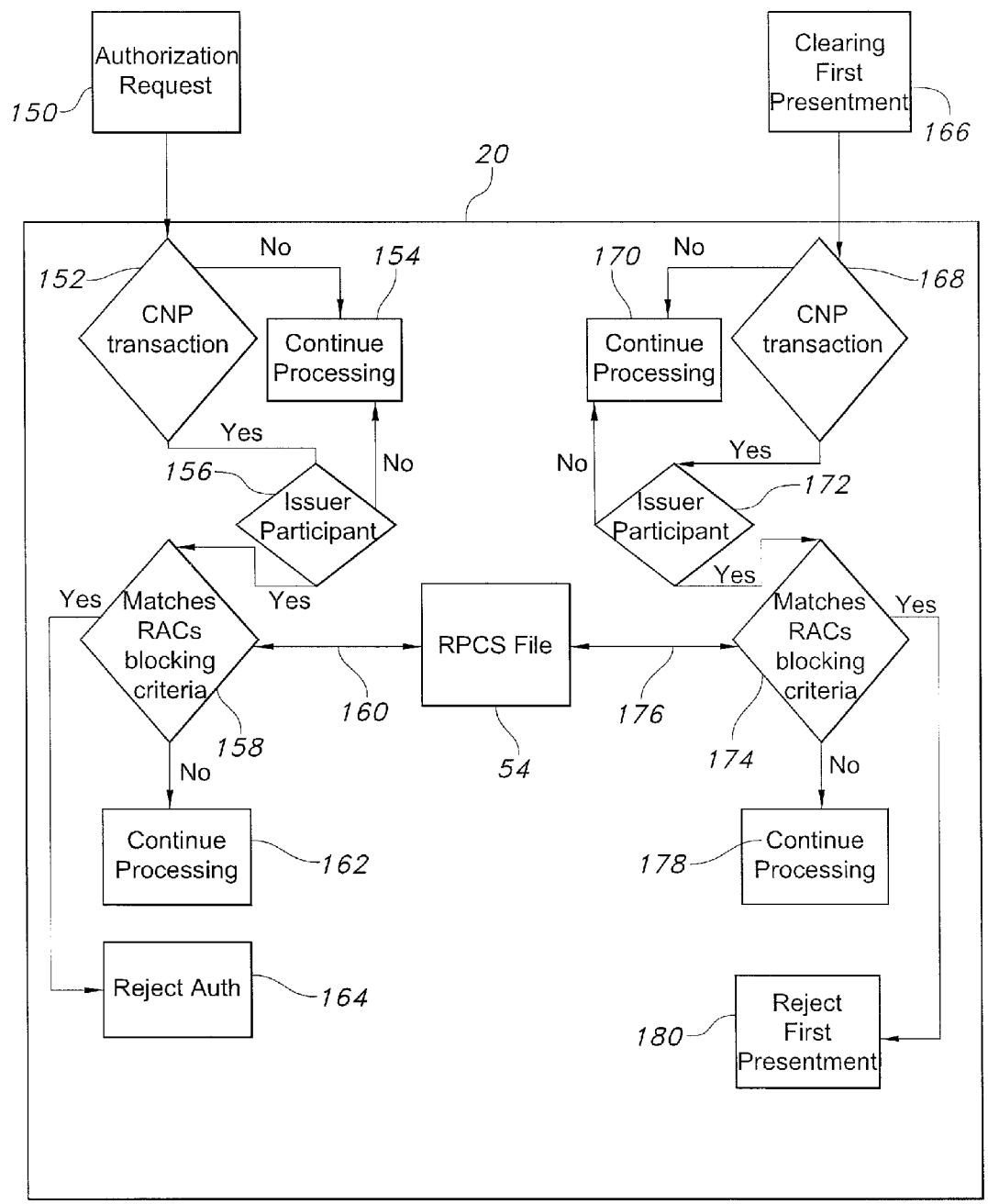
FIG. 7 is a flow diagram of still another alternative authorization and clearance process for a card-based transaction.

Turning to the first embodiment shown in FIG. 6, an authorization request 116 is submitted to network 20, which then considers whether the payment associated with the request is a recurring payment (118). If the submitted payment is identified as a recurring payment, then the process continues at step 120 as discussed hereinabove with respect to step 76 in FIG. 3. However, if the payment associated with authorization request 116 is not identified as a recurring payment, then network 20 considers whether the issuing bank is an issuer participant (122). If the issuing bank is not an issuer participant, then the transaction is continued at step 124 in ordinary fashion. If the issuing bank is an issuer participant, then network 20 determines whether the data associated with the proposed charge defined in the authorization request matches the RAC blocking criteria (126). This step is indicated at 128, and is accomplished by accessing RPCS file 54. If RAC blocking criteria are not found, then the processing of the transactions continues at step 130 in ordinary fashion. If RAC blocking criteria are found, then the process considers certain secondary criteria (131).

In this first embodiment, network 20 considers selected secondary criteria in step 131 before approving or denying the authorization request. More particularly, the process can be configured to deny the authorization request at 132 when a predefined number of secondary criteria are matched, or when a particular weighting of all criteria has been reached. These secondary criteria can include the identity of the merchant, the size of the merchant, the length of time such merchant has been doing business, the number of cancelled recurring payments associated with such merchant, the number of chargebacks associated with such merchant, the billing date, etc. It is contemplated that different secondary criteria can be assigned different values. It is also contemplated that the number of matches necessary to cause an authorization request to be denied can be targeted and specific to a particular issuing bank. This can provide the issuing bank with an additional degree of control over the cards and accounts issued to its customers. Considering these additional criteria before denying an authorization request can reduce the likelihood that a legitimate charge is denied.

Inasmuch as a card based payment also involves a clearance process, this provides the issuing bank with a second opportunity to identify an unauthorized charge. As shown in FIG. 6, clearing presentment 134 is submitted to network 20. If the payment associated with clearing presentment 134 is a recurring payment, then the process continues at step 136 as discussed hereinabove with respect to FIG. 3. However, if the payment associated with clearing presentment 134 is not identified as a recurring payment then the network considers whether the issuing bank is an issuing participant (138). If the issuing bank is not an issuer participant, then the process continues at step 140 in ordinary fashion. If the issuing bank is an issuer participant, then network 20 determines whether the data associated with the charge defined in the clearing presentment matches the RAC blocking criteria (142). This step is indicated at 144, and is accomplished by accessing RPCS file 54. If RAC blocking criteria are not found, then the process continues at step 146 in ordinary fashion. If RAC blocking criteria are found, then the clearing process considers certain secondary criteria (147).

In this first embodiment, network 20 considers selected secondary criteria before approving or denying the presentment request. More particularly, the process can be configured to deny the presentment at 148 when a predefined number of secondary criteria are matched, or when a particular weighting of all criteria has been reached. These secondary criteria can include the identity of the merchant, the size of the merchant, the length of time such merchant has been doing business, the number of cancelled recurring payments associated with such merchant, the number of chargebacks associated with such merchant, the billing date, etc. It is contemplated that different secondary criteria can be assigned different values. It is also contemplated that the number of matches necessary to cause a presentment to be denied can be target and specific to a particular issuing bank. This can provide the issuing bank with an additional degree of control over the cards and accounts issued to its customers. Considering these additional criteria before denying a payment request can reduce the likelihood that a legitimate charge is denied.

Turning to the second embodiment shown in FIG. 7, an authorization request 150 is submitted to network 20, which then considers whether the payment associated with the request is a card-not-present (CNP) transaction (152). CNP transactions include, among others, the recurring payments discussed herein. If the submitted payment is not identified as a CNP transaction, then the process continues at step 154 in ordinary fashion. However, if the payment associated with authorization request 150 is identified as a CNP transaction, then network 20 considers whether the issuing bank is an issuer participant (156). If the issuing bank is not an issuer participant, then the transaction is continued at step 154 in ordinary fashion. If the issuing bank is an issuer participant, then network 20 determines whether the data associated with the proposed charge defined in the authorization request matches the RAC blocking criteria (158). This step is indicated at 160, and is accomplished by accessing RPCS file 54.

If RAC blocking criteria are not found, then the processing of the transactions continues at step 162 in ordinary fashion. If RAC blocking criteria are found, then the authorization request is rejected at step 164.

Inasmuch as a card based payment also involves a clearance process, this provides the issuing bank with a second opportunity to identify an unauthorized charge. As shown in FIG. 7, clearing presentment 166 is submitted to network 20, which then considers whether the payment associated with the presentment is a CNP transaction (168). If the payment associated with clearing presentment 166 is not identified as a CNP transaction, then the process continues at step 170 in ordinary fashion. However, if the payment associated with clearing presentment 134 is identified as a CNP transaction, then the network considers whether the issuing bank is an issuer participant (172). If the issuing bank is not an issuer participant, then the process continues at step 170 in ordinary fashion. If the issuing bank is an issuer participant, then network 20 determines whether the data associated with the charge defined in the clearing presentment matches the RAC blocking criteria (174). This step is indicated at 176, and is accomplished by accessing RPCS file 54. If RAC blocking criteria are not found, then the process continues at step 178 in ordinary fashion. If RAC blocking criteria are found, then the clearing presentment is rejected at step 180.

Thus, in this second embodiment, network 20 identifies all CNP transactions, and automatically checks for matching blocking criteria for participating issuers—irrespective of how the transaction is coded. In this way, an issuer is more likely to "catch" unauthorized recurring charges which have not been properly coded as such, whether done innocently or intentionally. In other words, if the data associated with the proposed transaction matches the RAC blocking criteria in the RPCS file, and the transaction is a CNP transaction, then the authorization request or presentment will be denied.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A method of reducing chargebacks due to a cancelled recurring payment, said cancelled recurring payment occurring within a card-based financial network, said network including a database of unauthorized recurring charges and a processing device executing a defined chargeback procedure, the method comprising the steps of:
   initiating a chargeback procedure, by the processing device, by an issuing bank within said network;
   creating, by said processing device, an entry within said database during said chargeback procedure in response to detecting, by said processing device, that said chargeback procedure is associated with a cancelled recurring payment; and
   identifying, by said processing device, said cancelled recurring payment subsequently in said database as an unauthorized recurring charge.

2. The method according to claim 1, further comprising extracting, by said processing device, predefined data associated with said cancelled recurring payment; and
   wherein said creating step further includes the populating a field associated with said database with said predefined data.

3. The method according to claim 2, wherein said creating step further includes:
   a) comparing, by said processing device, said predefined data associated with said cancelled recurring payment to file data contained within said database;
   b) inputting, by said processing device, at least one item from said predefined data into said database in accordance with predefined parameters.

4. The method according to claim 1, wherein said entry comprises information including at least one of an account number, a merchant identity, a merchant bank identity or a transaction amount.

\* \* \* \* \*